Feb. 28, 1933. F. L. LAKE 1,899,871
FLEXIBLE STEM
Filed Feb. 25, 1931
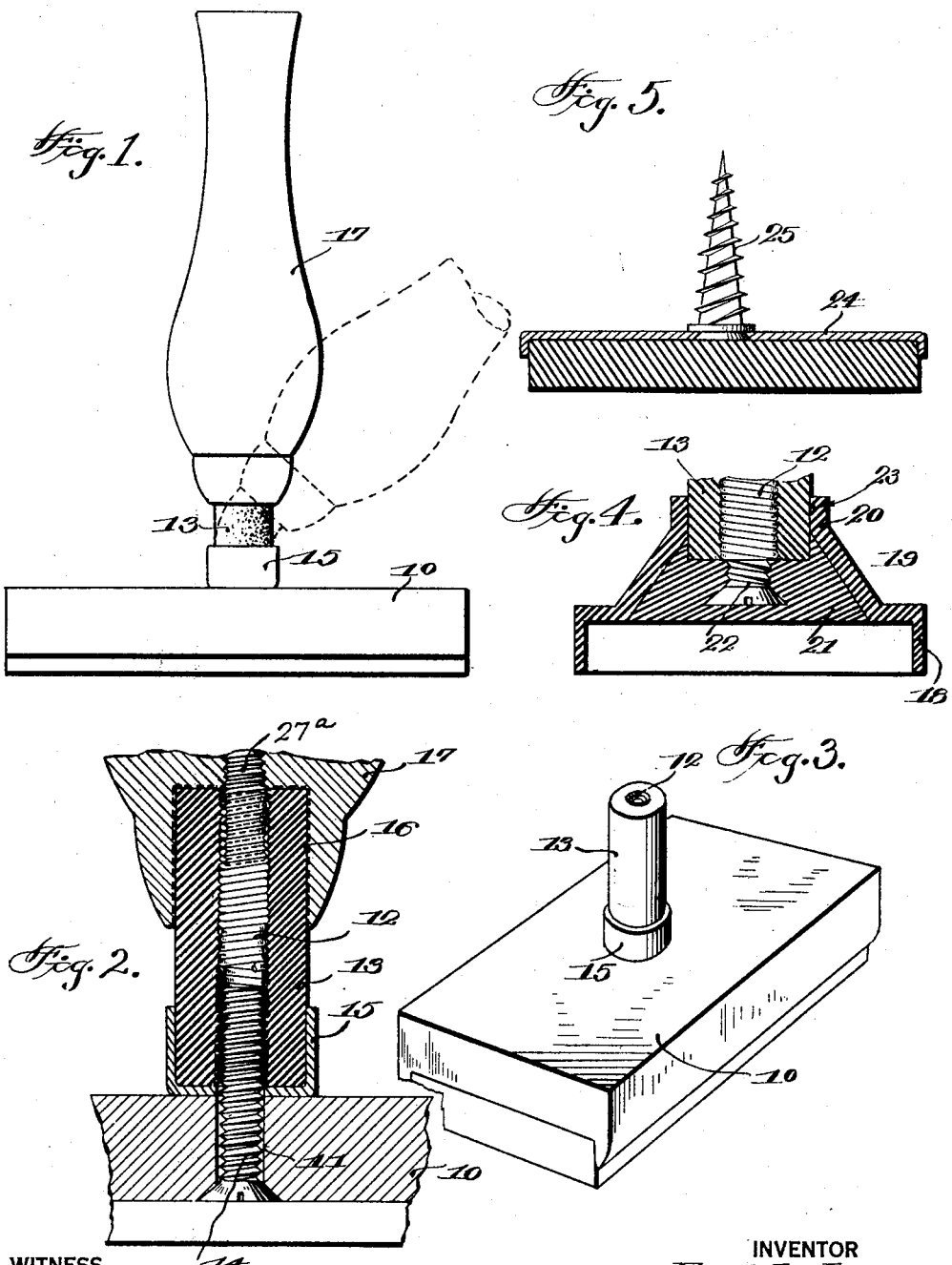
INVENTOR
Fred L. Lake
BY
ATTORNEY
WITNESS Patented Feb. 28, 1933

1,899,871

UNITED STATES PATENT OFFICE

FRED L. LAKE, OF DALLAS, TEXAS

FLEXIBLE STEM

Application filed February 25, 1931. Serial No. 518,247.

This invention relates to improvements in flexible stems for hand stamps, time stamps and other articles or devices employing a flexible stem.

It is an object of the invention to provide a hand stamp or analogous article having a flexible stem to relieve the jar incident to use and to insure that the article will strike flat regardless of the angle of the handle thereof.

While flexible rubber stems for hand stamps and other articles have been employed, for example as shown in my prior Patent No. 1,640,414, no practical means has been heretofore devised of providing the common wood, bakelite, metal or other stamp mounts with a flexible stem. When a rubber stem is employed on the common type of stamp mounts etc., the stamp is usually fastened to the mount by means of a screw and it has been found that the screw soon tears out of the rubber causing a separation of the handle and mount.

It is also an object of the present invention then, to provide a stamp having a flexible stem which will remain securely attached to the stamp or other mount and will not have a tendency to tear or break away under hard usage.

More specifically the object of the invention is to provide a flexible stem consisting of a coil spring which may be provided with a rubber covering or may be embedded in the lower end of a flexible handle of any desired shape.

Other objects and advantages of the invention will become apparent during the following detailed description when read in conjunction with the accompanying drawing which forms a part of this specification and in which, Figure 1 is a side elevation of a hand stamp or analogous article embodying the invention and showing in dotted lines an angular disposition of the stem and handle.

Fig. 2 is a fragmentary central vertical sectional view of the device of Fig. 1;

Fig. 3 is a perspective view of the device of Fig. 1 with the handle removed;

Fig. 4 is a vertical sectional view of a modified form of the invention; and

Fig. 5 is a vertical sectional view of another modified form of the invention.

Referring now more particularly to the drawing wherein like numerals refer to like parts throughout the same, 10 indicates the base of the stamp shown in Figs. 1, 2 and 3. The base 10 is of the wooden type and is provided with a vertical bore 11 approximately centrally thereof.

My improved flexible stem comprises a coil spring 12 embedded in a length 13 of flexible rubber preferably circular in cross section. The rubber body terminates flush with the ends of the spring. The stem is secured to the base 10 by means of a screw 14 which extends upwardly through the bore 11 and threadedly engages within the spring 12, drawing the end of the composite stem tightly against the upper surface of the base. A metal cup 15 is preferably provided for enclosing the lower end of the stem, the screw 14 extending through the bottom of the cup which is clamped between the end of the stem and the base. The cup 15 prevents undue bending strain upon the end of the stem engaged by the screw 14 thereby eliminating any possibility of distortion of the spring.

The upper end of the stem engages in a socket 16 in the end of a handle 17, being secured therein in any desirable manner such as by means of glue, cement or a screw 27a extending from said socket as shown by dotted lines in Fig. 2.

In the form of the invention shown in Fig. 4, the base 18 is made of a moulded material such as bakelite and is provided with a central conical boss 19 which terminates in a circular vertical flange 20. The space encompassed by the boss 19 is partially filled with a moulded material such as hard rubber 21 in which an upstanding screw 22 is embedded. The circular flange 20 cooperates with the partially filled boss 19 to produce a cup like socket 23 with the screw 22 upstanding centrally thereof. The flexible stem is adapted to fit within the cup or socket 23 and to be secured therein by the threaded engagement of the screw 22 with the spring 12.

In the form shown in Fig. 5, I have employed a sheet metal base 24 which has an upstanding screw 25 rigidly fastened thereto, the screw 25 being adapted for engagement with the coil spring 12 in the same manner as screws 14 and 22.

It will thus be seen that I have provided a flexible stem which is exceedingly efficient in use and one which absolutely eliminates the possibility of tearing loose from the base.

Although a preferred embodiment of the invention has been shown and described, it will be understood that various changes in the details of construction may be made without departing from the spirit of the invention as defined by the appended claims.

I claim:

1. In a device of the character described, a handle member, a flexible stem carried thereby and including a coiled spring embedded therein and extending substantially throughout the length thereof, a base member, means comprising a screw member carried by said base member for engaging said spring whereby to secure said stem to said base member, and an integral annular flange formed with said base member and embracing the end of said stem.

2. In a rubber stamp construction, a base member, a handle member, a flexible rubber stem connecting said members and having a coiled spring embedded therein and extending from end to end thereof, said handle member being formed with a socket for receiving one end of said stem, a screw threaded securing element carried by the handle and arranged to engage within the one end of said coiled spring, a cup-shaped member for receiving the opposite end of the stem, and a screw carried by the base member arranged to pass through said cup-shaped member and engaged within the end of said coiled spring for clamping said cup-shaped member to said base.

3. In a rubber stamp construction, a flexible rubber stem, a coiled spring embedded in said stem, a handle, means for securing said stem and said spring to said handle, a screw carried by the base for securing the opposite end of said spring, and means carried by the base and arranged to surround the lower portion of the stem for preventing the breaking of the stem near the base.

FRED L. LAKE.